US006438679B1

(12) United States Patent
Sollars

(10) Patent No.: US 6,438,679 B1
(45) Date of Patent: *Aug. 20, 2002

(54) MULTIPLE ISA SUPPORT BY A PROCESSOR USING PRIMITIVE OPERATIONS

(75) Inventor: Donald L. Sollars, Milpitas, CA (US)

(73) Assignee: Brecis Communications, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/120,043

(22) Filed: Jul. 21, 1998

Related U.S. Application Data

(63) Continuation-in-part of application No. 08/963,387, filed on Nov. 3, 1997, now Pat. No. 5,940,626.

(51) Int. Cl.$^7$ .................................................. G06F 9/90
(52) U.S. Cl. ....................................................... 712/208
(58) Field of Search ..................................... 712/43, 208

(56) References Cited

U.S. PATENT DOCUMENTS

| 4,459,666 A | * | 7/1984 | Kruger ........................ 364/200 |
| 4,525,780 A | | 6/1985 | Bratt et al. |
| 5,287,490 A | | 2/1994 | Sites |
| 5,404,469 A | * | 4/1995 | Chung et al. ................ 395/375 |
| 5,430,862 A | | 7/1995 | Smith et al. |
| 5,438,668 A | | 8/1995 | Coon et al. |
| 5,568,401 A | | 10/1996 | Narayanaswami |
| 5,568,646 A | * | 10/1996 | Jaggar ........................ 395/800 |
| 5,574,873 A | | 11/1996 | Davidian |
| 5,574,927 A | | 11/1996 | Scantlin |
| 5,598,546 A | * | 1/1997 | Blomgren .................... 395/385 |
| 5,638,525 A | * | 6/1997 | Hammond et al. ......... 395/385 |
| 5,740,461 A | * | 4/1998 | Jaggar ........................ 395/800 |
| 5,742,802 A | | 4/1998 | Harter et al. |
| 5,774,686 A | * | 6/1998 | Hammond et al. ......... 395/385 |
| 5,854,913 A | * | 12/1998 | Goetz et al. ................ 395/386 |
| 5,884,057 A | * | 3/1999 | Blomgren et al. .......... 395/375 |
| 5,940,626 A | | 8/1999 | Sollars |
| 6,021,265 A | * | 2/2000 | Nevill ......................... 395/385 |
| 6,023,756 A | * | 2/2000 | Okamura ..................... 712/208 |
| 6,058,469 A | * | 5/2000 | Baxter ......................... 712/43 |
| 6,308,254 B1 | * | 10/2001 | Sollars |

OTHER PUBLICATIONS

Hastie et al., "The Implementation of Hardware Subroutines on Field Programmable Gate Arrays", IEEE, 1990, pp. 31.4.1 to 31.4.4.*

Computer Architecture and Quantitative Approach; Authors: John L. Hennessy, David A. Patterson; Morgan Kaufmann Publishers, Inc., 1990 Chapter 3, entitled "Instructions Set Design: Alternatives and Principles", pp. 89–137.

Computer Architecture and Quantitative Approach; Authors: John L. Hennessy, David A. Patterson; Morgan Kaufmann Publishers, Inc., 1990, Chapter 5, entitled "Basic Processor Implementation Techniques", pp. 199–248.

* cited by examiner

Primary Examiner—John A. Follansbee
(74) Attorney, Agent, or Firm—Blakely Sokoloff Taylor & Zafman LLP

(57) ABSTRACT

A processor is provided with a datapath and control logic to control the datapath to selectively effectuate execution of instructions of multiple ISA. In some embodiments, execution of the instructions of the different ISA are effectuated by selectively executing primitive operations (POP) of different ISA implementing POP collections. In some embodiments, the processor further includes at least one ISA selector accessible to the control logic to facilitate the control logic in controlling the datapath to selectively effectuate execution of the instructions of the different ISA. In some embodiments, the processor further includes an ISA library, storing and supplying, e.g. different collections of primitive operations implementing instructions of the different ISA, and logical to physical mappings of the different ISA.

31 Claims, 11 Drawing Sheets

MULTIPLE ISA SUPPORT BY A PROCESSOR USING PRIMITIVE OPERATIONS

RELATED APPLICATION

The present invention is a continuation-in-part application to application Ser. No. 08/963,387, entitled "A Processor Having An ISA Implemented With Hierarchically Organized Primitive Operations", filed on Nov. 3, 1997, and issued as U.S. Pat. No. 5,940,626, having identical inventorship with the present invention.

BACKGROUND OF THE INVENTION

1. Field of the Invention

The present invention relates to the field of processors. More specifically, the present invention relates to the subject matter of processor instruction set architectures (ISA).

2. Background Information

Every processor has an ISA. The term ISA as used herein refers to the aspects of a processor that are visible to a programmer or compiler writer, wherein the term processor as used herein is intended to include micro-controllers (MCU), digital signal processors (DSP), general purpose microprocessors ($\mu$P), and the like. The ISA of the various processors known in the art can be differentiated by the type of internal storage provided by the processor for instruction operands, the number of explicit operands named per instruction, whether instruction operands can be located outside the processor, the various operations provided, the type and size of the operands, and so forth.

Historically, implementation of an ISA is accomplished through the control logic provided to a processor to control the processor's datapath in performing arithmetic logic operations, which is typically specific for the ISA to be implemented. The term datapath as used herein is intended to be a collective reference to the processor elements employed in performing arithmetic logic operations. In the case of prior art processors, prior art datapath typically includes arithmetic logic unit(s) (ALU), operand register file, various control registers and so forth. The control logic is provided either through hardwired logic or microprogramming (also referred to as microcode or firmware). In the case of hardwired logic, typically one or more random control logic block are employed to generate the proper control signals to be output to control the datapath. The proper control signal to be output at a particular clock cycle is selected based on the current state of the processor, feedback from the datapath and the opcode of the next instruction to be executed. In the case of microprogramming, typically microinstructions are employed to specify the control signals for the datapath. The microinstructions are stored e.g. in a read-only-memory (ROM), and selected for output in each clock cycle, based on the current microinstruction program counter (PC). At each clock cycle, the microinstruction PC is modified based on a newly computed next microinstruction PC, the current microinstruction output (specifying in part the next microinstruction to be output), feedback from the datapath, and/or the opcode of the next instruction to be executed (also referred to as the next macroinstruction).

Some prior art successor processors, for legacy reasons, would accept complex instruction set computer (CISC) instructions of an historic ISA, and decode them into reduced instruction set computer (RISC) instructions of a new internal ISA for execution, even though the processors are designed with more modern RISC principles. Typically, the new internal ISA is designed to specifically mimic the historic ISA. The processor is provided with a decoder to handle the conversion between the two architectures, and control logic is equipped to control the datapath to specifically implement the new internal ISA. Instructions of the internal ISA are issued to the datapath using a microinstruction program counter.

These prior art approaches to implementing an ISA and controlling a processor's datapath suffer from a number of disadvantages. First and foremost, each processor is capable of executing only one ISA. Much of the control logic of a processor would have to be redesigned if the processor is to be adapted to support a different or a new ISA. Except for enhancements and extensions to an existing ISA, the industry almost never adapt a processor to support a different or a new processor, because of the amount of redesign effort would have been required. Virtually all processors supporting a new ISA are considered to be new designs. As a result, the industry is often confronted with significant conversion effort to adopt a more powerful new processor, executing a new ISA, to replace a number of less powerful older processors, executing their respective old ISA. Alternatively, the conversion effort becomes a significant roadblock to the wider acceptance or deployment of the more powerful new processor. For example, in many applications it is actually more price/performance effective to use anyone of a number of newer general purpose microprocessors, then to continue to use an older DSP in combination with an older MCU, but for the conversion cost of the legacy code.

Thus, a more effective approach to ISA implementation and controlling a processor's datapath without some of the prior art disadvantages is desired.

SUMMARY OF THE INVENTION

A processor is provided with a datapath and control logic to control the datapath to selectively effectuate execution of instructions of multiple ISA.

In some embodiments, execution of the instructions of the different ISA are effectuated by selectively executing primitive operations (POP) of different ISA implementing POP collections. Among some of these embodiments, the POP of each collection are hierarchically organized.

In some embodiments, the processor further includes at least one ISA selector accessible to the control logic to facilitate the control logic in controlling the datapath to selectively effectuate execution of the instructions of the different ISA. Among some of these embodiments, the at least one ISA selector facilities the control logic in controlling the datapath to selectively effectuate execution of instructions of the different ISA in different deployments of the processor. In other embodiments, the at least one ISA selector facilities the control logic in controlling different sets of resources of the datapath to selectively effectuate execution of instructions of the different ISA. In yet other embodiments, the at least one ISA selector facilities the control logic in controlling a set of resource of the datapath to selectively effectuate execution of instructions of different user instruction streams that are of different ISA. In yet other embodiments, the at least one ISA selector facilities the control logic in controlling a set of resource of the datapath to selectively effectuate execution of instructions of different portions of a user instruction streams that are of different ISA.

In some embodiments, the processor further includes an ISA library. Among some of these embodiments, the ISA library stores and supplies different collections of primitive operations implementing instructions of the different ISA. In other embodiments, the ISA library also stores and supplies other control information for the different ISA, such as logical to physical mappings.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
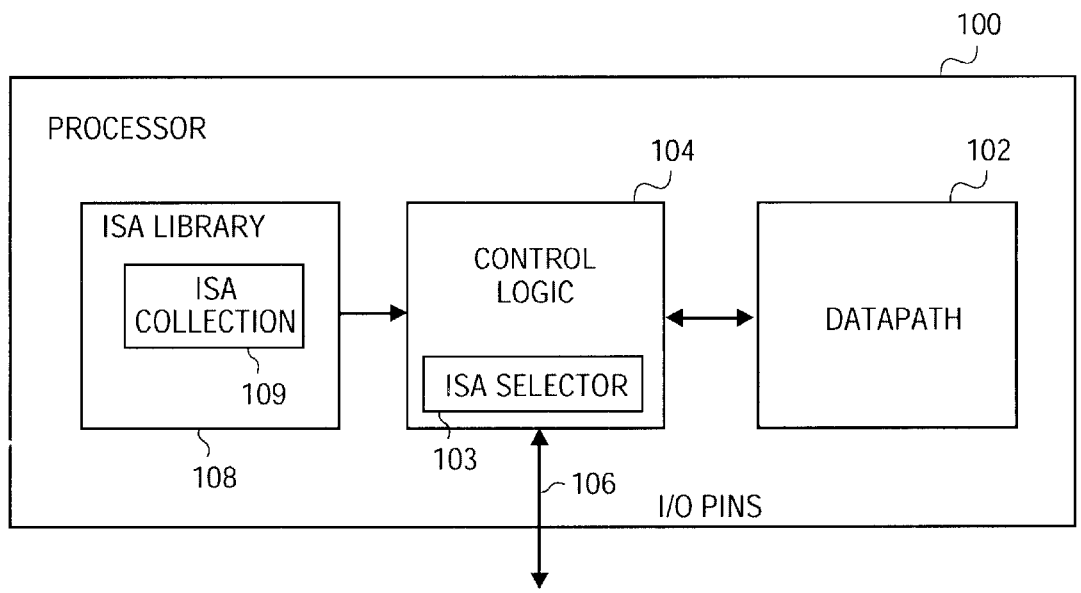
FIG. 1 illustrates one embodiment of a processor incorporated with the teachings of the present invention.

Referring now to FIG. 1, wherein a block diagram illustrating one embodiment of a processor incorporated with the teachings of the present invention is shown. Processor 100 includes datapath 102 and control logic 104 coupled to each other as shown. In accordance with the present invention, control logic 104 controls datapath 102 to selectively effectuate execution of instructions of multiple ISA. For the illustrated embodiment, the selective execution of instructions of the different ISA is effectuated through selective execution of primitive operations (hereinafter POP) of multiple POP collections 109, correspondingly implementing instructions of the ISA. Furthermore, processor 100 includes at least one ISA selector 103 accessible to control logic 104 in controlling datapath 102 to effectuate the desired execution of instructions of multiple ISA; and ISA library 108 coupled to control logic 104 to store and supply the POP to datapath 102 through control logic 104. For the illustrated embodiment, ISA selector 103 is part of control logic 104. In alternate embodiments, ISA library 108 may be disposed outside processor 100.

These and other aspects of the present invention will be further described in turn below. As will be apparent from the descriptions to follow, execution of the instructions of the different ISA may be effectuated in corresponding different deployments of the processor, as well as within one deployment of the processor. Within one deployment of the processor, execution of the instructions of the different ISA may be effectuated in parallel, using multiple sets of resources of the datapath, as well as serially or interleavingly, using one set of resources of the datapath. When using one set of resources, execution of the instructions of the different ISA may be effectuated for different user instruction streams correspondingly having instructions of the different ISA, or different portions of a user instruction stream correspondingly having instructions of the different ISA.

Turning first to the ISA implementing collections of POP. The term POP as used herein refers to a new type of micro-level instruction. These micro-level instructions are new in the sense that they are designed to be organized into logical units to facilitate their employment to effectuate execution of instructions of one or more ISA. For the illustrated embodiment, the implementing POP of an instruction are hierarchically organized. As a result of the novel manner of how these new micro-level instructions or POP are organized, only a relatively small set of POP are required to form the higher level logical units for use in effectuating execution of instructions of one or more ISA by datapath 102 under the control of control logic 104. Additionally, unlike prior art, execution flows from one logical unit of POP to another logical unit of POP without the need of a conventional micro-program counter.

Figure 2:
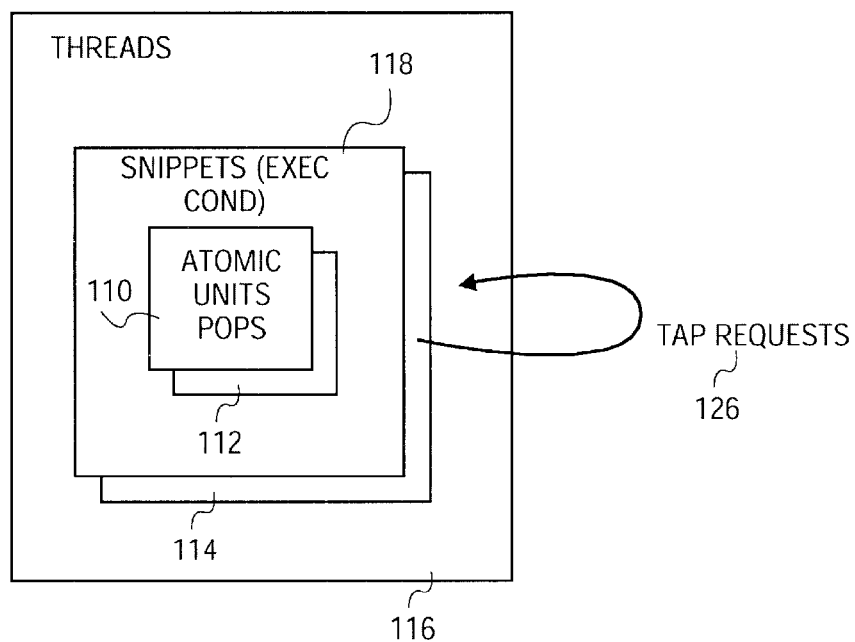
FIG. 2 illustrates one embodiment of an hierarchical organization of the POP of the present invention.

FIG. 2 illustrates one embodiment of an hierarchical organization of POP of the present invention for implementing one instruction of an ISA. As shown, selected ones of interdependent POP 110 having certain ensured order of completion are first combined to form atomic units 112. Next, selected ones of atom units 112 are then combined to form snippets 114, with each snippet 114 having one or more atomic units 112. Then, selected ones of snippets 114 are logically associated to form execution threads 116, with each execution thread 116 having one or more snippets 114. Furthermore, for the illustrated embodiment, an execution condition 118 may be specified for each atomic unit 112, governing the conditional execution of the atomic unit 112. Each execution condition 118 is expressed in terms of one or more dynamic decision variables to be examined by control logic 104, and then control datapath 102 accordingly based on the state of the specified execution condition 118, i.e. whether to cause datapath 102 to execute the atomic unit 112 or not. As will be described in more details below, for the illustrated embodiment, control logic 104 is also equipped to maintain and process the dynamic decision variables. For the illustrated embodiment, execution conditions 118 governing the execution of the corresponding atomic units 112 are specified in snippets 114. to which the atomic units 112 are members of. Additionally, snippets 118 are logically associated to form execution threads 116. For the illustrated embodiment, snippets 118 are logically associated through trap requests 126 to control logic 104 made at the end of a predecessor snippet's execution.

Each instruction of an ISA is implemented using an execution thread 116 (hereinafter also referred to as implementing thread, or simply, thread). For this embodiment, the POP for effectuating increment of the macro instruction program counter (PC), to be described more fully below, are organized into a singular atomic unit snippet 114, and made an integral part of each execution thread 116. In an alternate embodiment, each instruction of an ISA is implemented using at least two execution threads 116. For this embodiment, the POP for effectuating increment of the PC are organized into a common singular snippet execution thread 116. This common singular snippet execution thread 116 is executed in conjunction with the execution threads 116 of the various instructions. In any case, the various threads 116 of hierarchically organized POP collectively implement the instructions of an ISA.

Figure 3A:
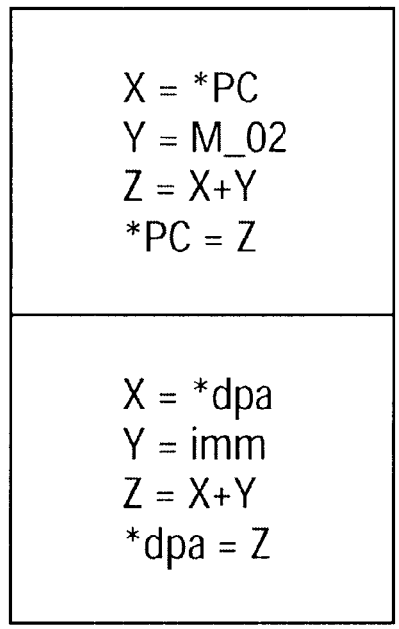
FIGS. 3a–3c illustrate various exemplary collections of POP.
Figure 3B:
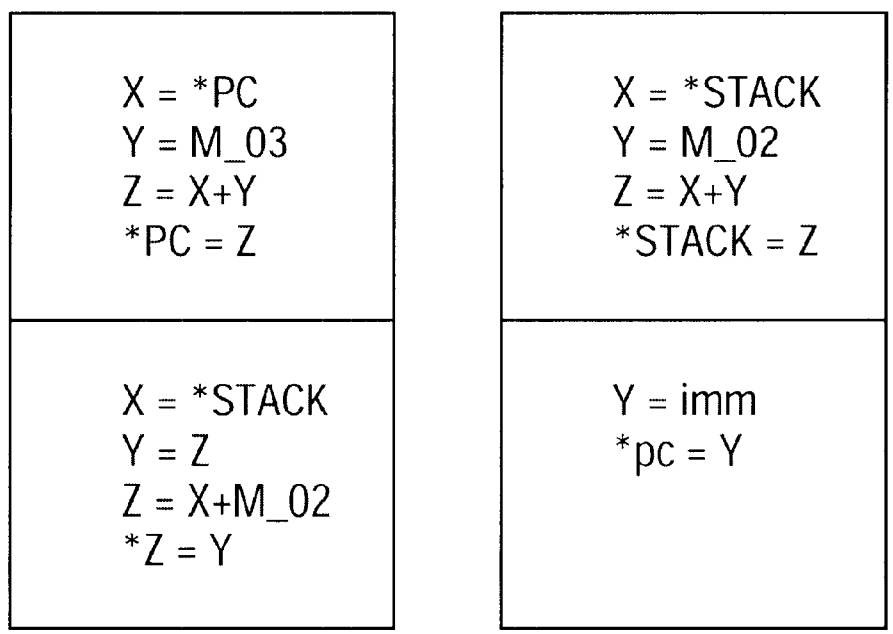
Figure 3C:
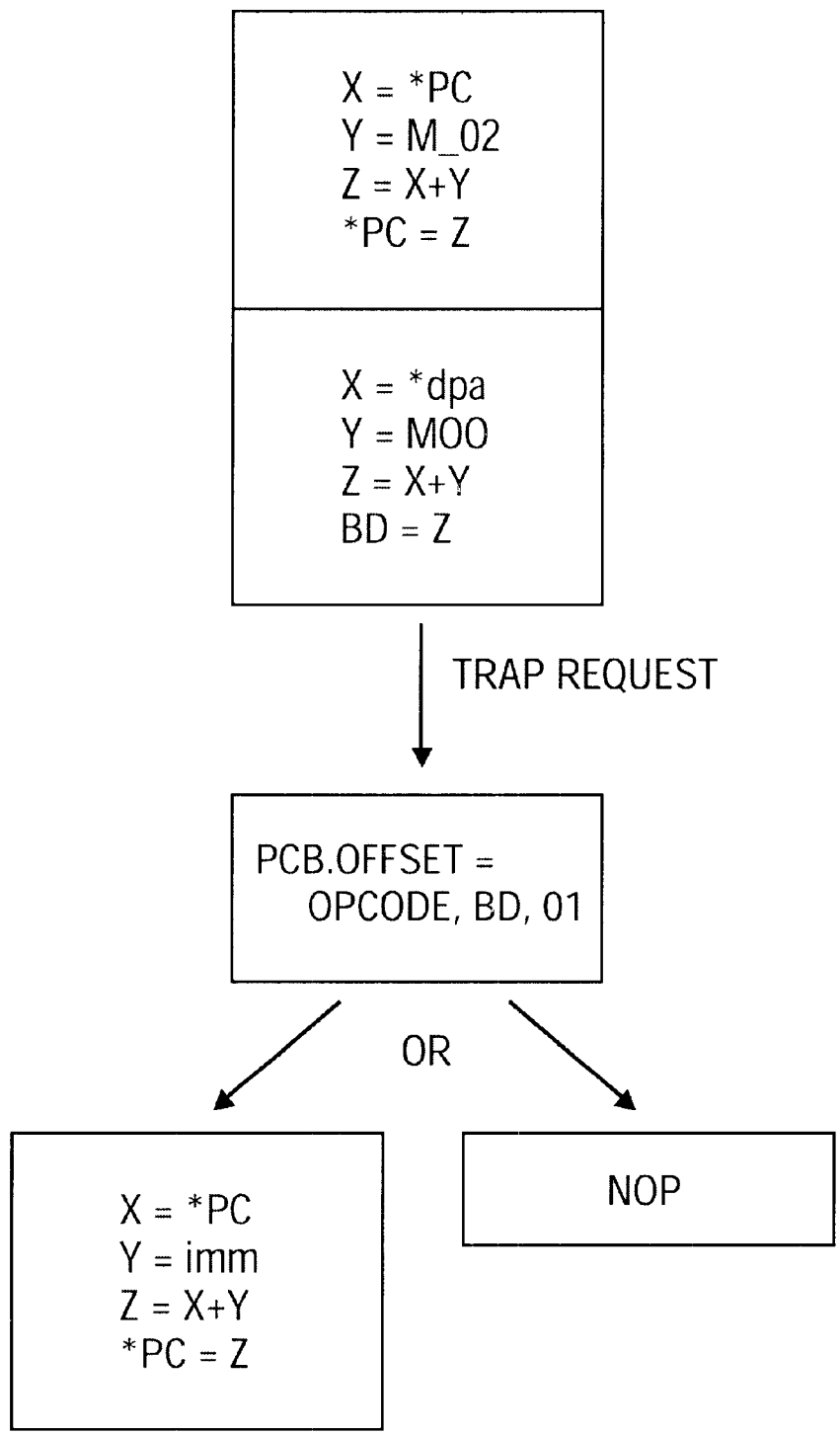

FIGS. 3a–3c illustrate how various exemplary POP are organized into atomic units, then snippets, and execution threads, to implement various exemplary instructions. The illustrations are presented in the context of an addressable operand storage medium having an x and an y output ports for outputting source operand values to two corresponding input ports of an arithmetic logic unit (ALU), and a z input port for accepting destination operand values from the output port of the ALU. Disposed between the x and y output ports and the input ports of the ALU are multiplexors to allow certain immediates or constants to be supplied to the ALU. Furthermore, the values on the x and y ports may also be by-passed to the z port. Any output value not not updated reatins its prior state. The employment of this context is merely for ease of understanding. Based on the description to follow, those skilled in the art will recognize that the present invention is not limited to the context employed.

FIG. 3a illustrates two exemplary collections of POP for implementation an exemplary ADD instruction for adding an immediate to a destination register. To implement the ADD instruction, the macro instruction pointer (pc) is incremented by two bytes (the instruction size of the exemplary ADD instruction), and an immediate extracted from the instruction is added to the content of a specified destination register (dpa). The first exemplary collection includes {x=*pc, y=m_02, z=x+y, *pc=z}, whereas the second exemplary collection includes {x=*dpa, y=imm, z=x+y, *dpa=z}.

For the first exemplary collection, POP "x=*pc" stands for outputting on the x port the data content of an addressable storage location, where the address of the addressable storage location is given by the macro instruction pointer (pc). POP "y="m_02" stands for routing a two mask (the size of the ADD instruction) to the "y" input port of the ALU. POP "z=x+y" stands for adding the two input values together, and outputting the sum for the z port. POP "*pc=z" stands for writing back the sum on port z to an addressable storage location, where the address of the addressable storage location is given by the value of PC.

Similarly, POP "x=*dpa" stands for outputting on port x the data content of an addressable storage location, where the address of the addressable storage location is given by the variable destination address (dpa). POP "y=imm" stands for routing an immediate constant extracted from the current instruction to the "y" input port of the ALU. POP "z=x+y" stands for adding the two input values, and outputting the sum for port z. POP "*dpa=z" stands for writing back the sum on port z to an addressable storage location, where the address of the addressable storage location is given by the value of variable destination address (dpa).

Thus, it can be seen that when executed, the first exemplary collection of POP can effectuate increment of a PC, and the second exemplary collection of POP can effectuate adding an immediate to a destination register. For the illustrated embodiment, the orderly completion of each of these exemplary collection POP are inherently ensured due to the timing characteristics of datapath 102. As a result, in accordance with the present invention, these exemplary collections of POP are organized into two atomic units. In other words, in accordance with the present invention, interdependent POP having the ensured orderly completion characteristic are organized together as atomic units. During operation, the POP of an atomic unit are all issued to the applicable elements of datapath 102 at the same time, without the need of a micro-program counter.

Additionally, the two atomic units are further organized into a snippet, and then a singular snippet execution thread.

FIG. 3b illustrates four exemplary collections of POP for implementing a long call (LCALL) instruction to be executed in two cycles. In a LCALL instruction, the PC is incremented by three bytes (the instruction size of the exemplary LCALL instruction), to point to the first instruction to be executed upon returning from the call. The incremented PC is then saved onto a stack. Next, the stack pointer is updated, and the target address of the call extracted from the instruction is copied into the PC. The first exemplary collection includes {x=*pc, y=m_03, z=x+y, *pc=z}, whereas the second exemplary collection includes {x=*stack, y=z, z=x+m_02, and *z=y}. The third exemplary collection includes {x=*stack, y=m_02, z=x+y, and *stack =z}, whereas the fourth exemplary collection includes {y=imm, and *PC=y}.

Except for the employment of a three mask, the first exemplary collection is the same PC increment collection illustrated in FIG. 3a. For the second exemplary collection, the meaning of POP "x=*stack" is similar to the earlier described POP "x=*dpa". That is, POP "x=*stack" stands for outputting on the x port the data content of an addressable storage location, where the address of the addressable storage location is the stack pointer, given by the variable "stack". The meaning of POP "y=z" is similar to the earlier described POP "y=imm". That is, the value for port z is to be fedback to the "y" input port of the ALU. (Note that in this context, z is the previous ALU result.) The meaning of POP "z=x+m_02" is similar to the earlier described POP "z=x+y". That is, the "x" input value is to be added to a two mask by the ALU, and the sum is to be output for the z port. The meaning of POP "*z=y" is also similar to the earlier described POP "*dpa=z". That is, POP "*z=y" stands for by-passing and writing back the y port value to an addressable storage location, where the address of the addressable storage location is given by the output value for the z port.

Thus, collectively the first and second exemplary collections of POP can be used to effectuate the first stage execution of the LCALL instruction. However, for the illustrated embodiment, the orderly completion of these POP is ensured only to the extent when they are segregated into two groups. Accordingly, they are first organized as two atomic units, and then in turn they are combined to form a snippet. During operation, once scheduled, the entire snippet will be executed, with the POP of each atomic unit being issued in order, without the need of a micro-program counter. For each atomic unit, all POP are issued to the applicable elements of datapath 102 at the same time, as described earlier.

For the third exemplary collection, the meaning of POP "x=*stack" was described earlier. POP "y=m_02" stands for providing a two mask to the "y" input of the ALU. The meaning of POP "z=x+y" was described earlier. Finally, POP "*stack=z" stands for writing back the output value for port z to an addressable storage location, where the address of the addressable storage location is the value of the stack pointer, given by the variable "stack". The POP is used to update the stack pointer with a new value. For the fourth exemplary collection, the meaning of POP "y=imm" was described earlier. POP "*pc=y" stands for by-passing and writing back the "y" input value to an addressable storage location, where the address of the addressable storage location is given by the value of PC.

Thus, collectively the third and fourth exemplary collections of POP can be used to effectuate the second stage execution of the LCALL instruction. However, for the illustrated embodiment, the orderly completion of these POP is ensured only to the extent when they are segregated into two groups. Accordingly, they too are first organized as two atomic units, and then in turn they are combined to form a snippet. During operation, once scheduled, the entire snippet will be executed, with the POP of each atomic unit being issued in order, without the need of a micro-program counter. For each atomic unit, all POP are issued to the applicable elements of datapath 102 at the same time, as described earlier.

In order to employ the two snippets together to effectuate the two stage execution of the LCALL instruction, in accordance with the present invention, the two snippets are logically associated together. For the illustrated embodiment, the two snippets are logically associated with each other using a trap request to control logic 104. In other words, in association with the definition of the first snippet, a trap to control logic 104 at the end of executing the first snippet is specified. The meanings of the various traps, i.e. in this case, the second snippet is to be scheduled for execution, are pre-defined for control logic 104. Other approaches to logically associating the snippets may be employed. Together, the two snippets form an execution thread for effectuating execution of the LCALL instruction.

FIG. 3c illustrates another five exemplary collections of POP for implementing a Jump If Accumulator Zero (JZ) instruction. The JZ instruction determines if the accumulator is zero. If so, execution continues at a target address using a displacement, based on the updated PC value, that is specified in the instruction; else execution continues with the next instruction. The first exemplary collection includes {x=*PC, y=m_02, z=x+y, and *pc=z}, whereas the second exemplary collection includes {x=*dpa, y=m_00, z=x+y, and BD=z }. The third exemplary collection includes {PCB.offset=opcode,BD,01}. The fourth exemplary collection includes {x=*PC, y=imm, z=x+y, and *pc=z}. Finally, the fifth exemplary collection includes {no-op}.

The first exemplary collection is the same PC increment collection described earlier. For the second exemplary collection, the meaning of POP "x=*dpa" and POP "z=x+y" were described earlier. POP "y=m_00" stands for routing a zero mask to the "y" input, and POP "BD=z" stands for writing back the output value for port z (in this case, the state of the zero flag of the ALU) into an addressable storage location where the value of a branch decision variable "BD" is stored.

Thus, collectively the first and second exemplary collections of POP can be used to effectuate the first stage execution of the JZ instruction. For the illustrated embodiment, the orderly completion of each of these exemplary collection of POP is also ensured. Accordingly, they are organized as two atomic units, and then combined into a snippet. During operation, the POP of each atomic unit are issued to the applicable elements of datapath 102 at the same time, without the employment of a micro-program counter.

For the third exemplary collection, POP "PCB.offset= opcode, BD, 01" stands for setting the variable PCB.offset to equal the concatenated value of "opcode, BD, 01". For this example, the PCB.offset variable holds the offset address employed to locate and dispatch the next snippet of a process for execution. The offset address in general is a function of the opcode of an instruction, plus a number of extended bits. In this case, the extended bits include the branch decision variable BD, to allow it to dynamically determine the next snippet. For the fourth exemplary collection, POP "x=*pc" stands for outputting on port x the data content of an addressable storage location, where the address of the addressable storage location is the value of PC. POP "y=imm" was described earlier. In this case, the immediate is the target displacement extracted from the instruction. The meanings of POP "z=x+y" and POP "*pc" were described earlier. The fifth exemplary collection is self-explanatory.

Thus, the fourth exemplary collection of POP can be used to effectuate the second stage execution of the JZ instruction if the branch is taken, whereas the fifth exemplary collection of POP can be used to effectuate the second stage execution of the JZ instruction if the branch is not taken. Moreover, the third exemplary collection of POP can be used to affect whether it is the fourth or the fifth exemplary collection of POP that get executed. For the illustrated embodiment, the orderly completion of each of these collections of POP is also ensured. Accordingly, they are organized as three separate atomic units, and then three singular atomic unit snippets. More importantly, the first snippet formed with the first and second exemplary collections is logically associated to the "branch taken" snippet as well as the "branch not taken" snippet, but dynamically resolves to one or the other. The logical association is accomplished by specifying a trap request to be executed at the end of executing the first snippet. Furthermore, the trap request is defined to control logic 104 as being serviced by the snippet formed with the third exemplary collection of POP. The various snippets are organized to form the implementing thread for the JZ instruction.

Accordingly, upon executing the first snippet, BD is generated. As a result of the trap request to control logic 104 at the end of execution of the first snippet, the trap handler (i.e. the third exemplary collection) is executed, and the offset address is dynamically set to the appropriate one of either the "branch taken" or the "branch not taken" snippet. When invoked, the POP of the singular atomic unit of the "branch taken" or "branch not taken" snippet are issued to the applicable elements of datapath 102 at the same time, without the employment of a micro-program counter.

Those skilled in the art will recognize that the above illustrated exemplary POP are just a small sample of the POP of the present invention. Many more POP can be constructed to direct the various specific operations of the elements of datapath 102. Experience has shown that, when compare to a conventional reduced instruction set, for similar functionality, the set of POP required will be smaller. It can also be seen from the above described exemplary POP, the POP of the present invention are similar to prior art micro-instructions in one aspect, in that each of the POP instructs an operation to be performed by an element of datapath 102. Therefore, it is well within the ability of those skilled in the art to construct the individual POP required to manipulate the various elements of a particular embodiment of datapath 102. Accordingly, except for the exemplary POP described above, the various POP will not be individually described. Once individually constructed, with the hierarchical organization description given, those skilled in the art will be able to hierarchically organize the various POP into higher level logical constructs, and execute the hierarchically organized POP based on their organization.

Having now explained an embodiment for hierarchically organizing the POP of the present invention, we turn now to describe their relationships to other aspects of the present invention. Before doing so, it should be noted also that the above exemplary POP are executed without reference to any conventional physical registers. The source operand value is directly supplied to the ALU from an addressable storage location storing a source operand, and the resulting value is also directly stored back from the ALU into the addressable storage location. In some cases, the addressable storage locations are emulating the functions of physical registers. Such direct manner of execution, i.e. directly supplying and receiving operand values from and to addressable storage locations (without register emulation), is the subject of co-pending U.S. patent application Ser. No. 08/963,389, entitled "Cache Memory Based Instruction Execution", filed Nov. 3, 1997, now U.S. Pat. No. 6,067,601, and having the same inventorship as well as assignee of the present invention. Register emulation is the subject of co-pending U.S. patent application Ser. No. 08/963,391, entitled "Virtual Register Sets", filed Nov. 3, 1997, now U.S. Pat. No. 6,178,482 and having the same inventorship as well assignee of the present invention. Each and everyone one of these co-pending applications are hereby fully incorporated by reference. However, such manners of execution are merely presently preferred, the present invention may be practiced with other manners of execution, including the employment of prior art physical registers.

Figure 4A:
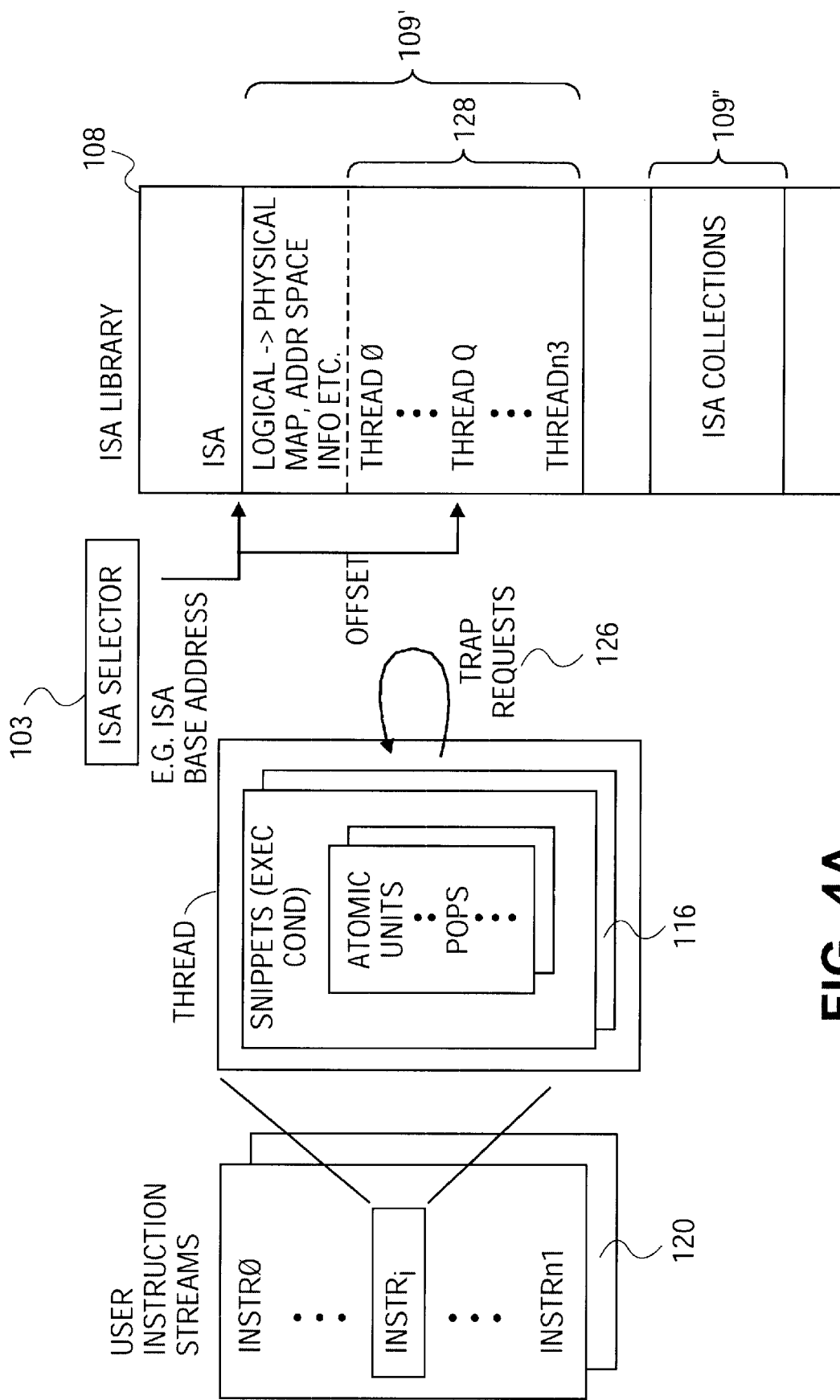
FIGS. 4a–4c illustrates the relationship between user instruction streams, instructions of an ISA, threads, ISA selector, and ISA library; and the formation of an heterogeneous user instruction stream.
Figure 4B:
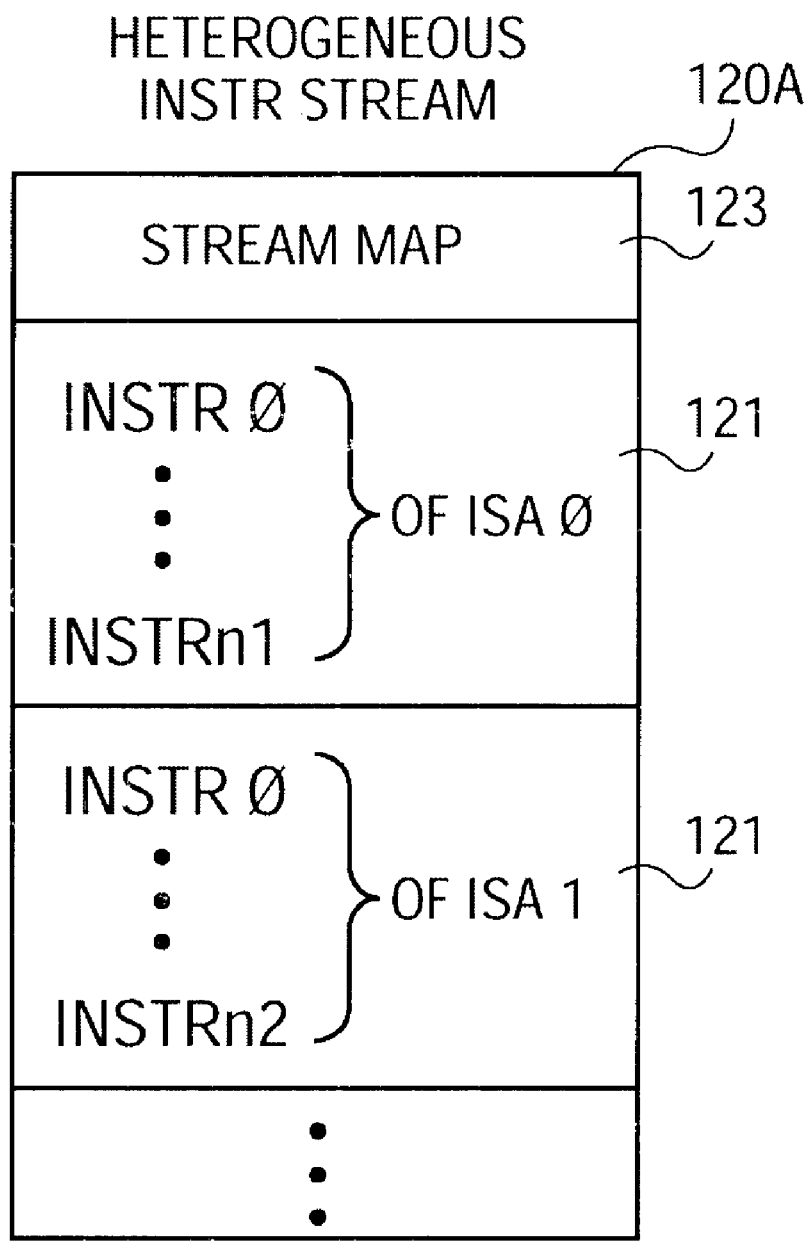
Figure 4C:
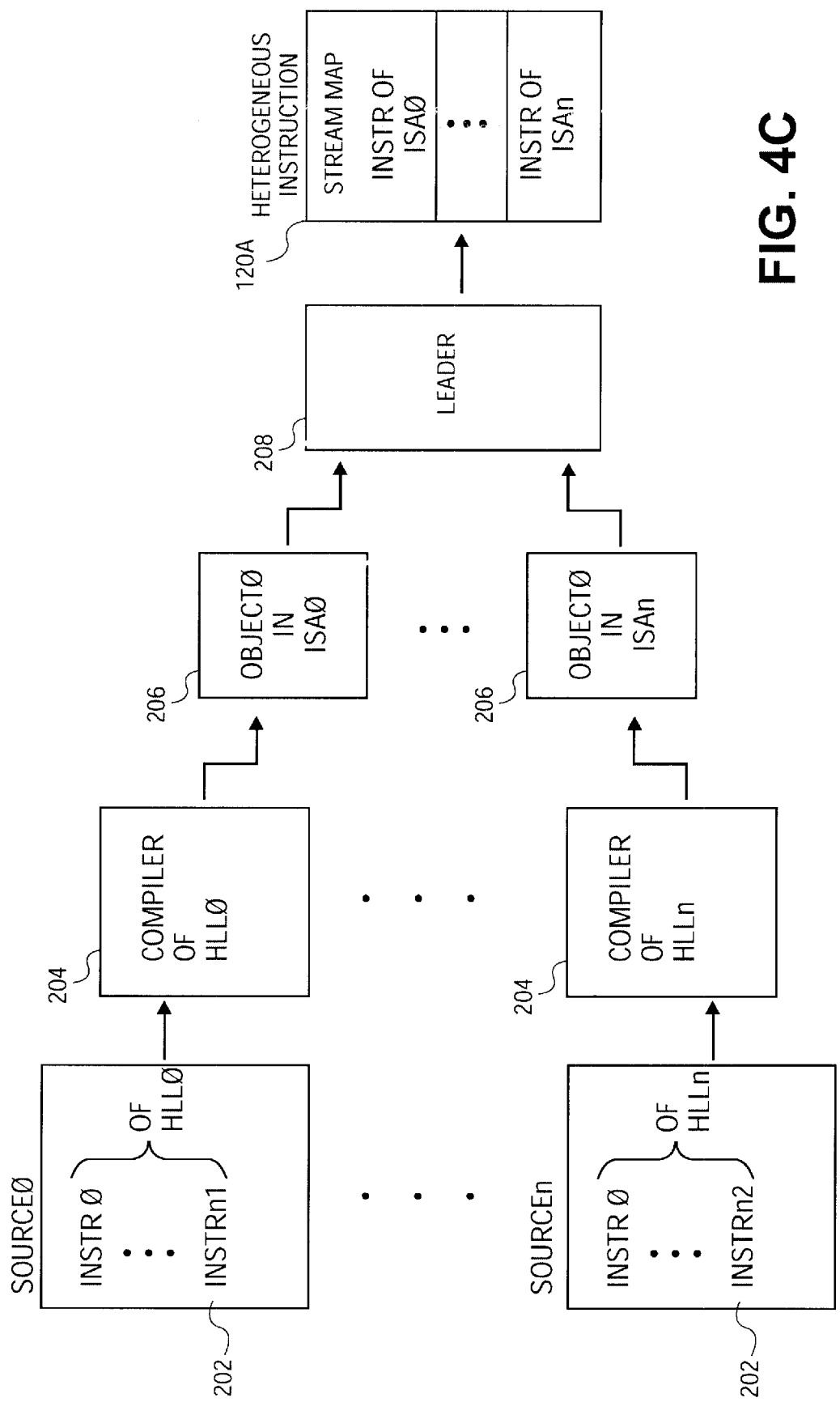

FIGS. 4a–4c illustrate the relationship between user instruction streams, instructions of an ISA, threads, ISA selector, and ISA library; and the formation of an heterogeneous user instruction stream. Shown in FIG. 4a is homogeneous user instruction stream 120 constituted with a number of instructions of an ISA, and shown in FIG. 4b is an heterogeneous user instruction stream 120a constituted with homogeneous portions 121 having instructions of different ISA. For the illustrated embodiment, included in heterogeneous instruction stream 120a is an instruction stream map 123 describing the instruction stream, in particular, the locations within the stream and the ISA of the different portions 121. In an alternate embodiment, the ISA is "memory page aligned", and the ISA of each memory page of instruction is denoted, e.g. at the starting byte(s) of the page. Other approaches, external to instruction stream 120a may be employed to describe instruction stream 120a. For examples, configurable control registers of control logic 102, a page table, or other like structures may be employed. Examples of instructions are ADD R1, R2 and R3, and LD R4, memory address, meaning add the contents of registers R2 and R3 and place the sum of the addition in register R1, and load the content of memory address into register R4 respectively. As described earlier, each instruction is implemented with one or more threads 116 of POP. The various threads of POP 116 employed to implement a particular ISA are stored in ISA library 108. For the illustrated embodiment, each collection of ISA implementing POP also includes control information for the ISA, e.g. logical to physical mappings for cache memory based direct instruction execution, address space information, and so forth. In one embodiment, control logic 104 is equipped with storage medium to pre-stage or cache the implementing threads of an ISA. Whether pre-staged in control logic 104 or not, an ISA selector 103 corresponding to the user instruction stream or a portion thereof is used to locate the start of all the implementing threads of the ISA. For the illustrated embodiment, ISA selector 103 is a base address to the starting memory location of collection 109'. Furthermore, the ISA selector 103 is stored in a control block, such as a context control block (CCB), created for a collection of user instruction stream, and dynamically updated if necessary (e.g. when the ISA changes between portions of an heterogeneous user instruction stream, or changes between two homogeneous user instruction stream). An offset address is used to locate the individual implementing threads. As described earlier, the offset address is a function of the opcode of an instruction plus a number of extended bits (in one embodiment, the extended bits are the snippet and atomic unit numbers). In one embodiment, the most significant field of the offset address is stored in a next lower level control block, such as a process control (PCB), created for a user instruction stream. FIG. 4c illustrates an exemplary approach for forming a heterogeneous user instruction stream with homogeneous portions. As illustrated, the homogeneous portions of heterogeneous user instruction stream 120a are created from corresponding object code 206 by linker 208. Object code 206 are created by compilers 204 compiling corresponding source code 202, e.g. a first compiler compiling a first high level language (HLL) source code into object code targeted for the 80X86 architecture, a second compiler compiling a second HLL source code into object code targeted for the M680X0 architecture, a third compiler compiling a third HLL source code into object code targeted for the TMS320 architecture, and so forth. The HLL may be any selected ones of HLL known in the art. In one embodiment, linker 208 is a composite linker having components similar to conventional linkers of the corresponding architecture. In addition, linker 208 includes a common component that binds the different portions together, including the provision of a stream map having control information that describes the various portions, e.g. their locations within the stream, the ISA of the corresponding portions, and so forth. In one embodiment, linker 208 describes the ISA of the corresponding portions by identifying the ISA, and ISA library 108 includes control information to allow control logic 104 to resolve the ISA identifications to the starting locations of the corresponding implementing POP collections of the different ISA in ISA library 108, e.g. an ISA identification to implementing collection starting location cross-reference table. In alternative embodiments, linker 208 is provided with information about the ISA libraries of the various embodiments of processor 100, and describes the ISA of the corresponding portions by directly providing the starting locations of the corresponding implementing POP collections of the different ISA in ISA library 108. In other embodiments, in lieu of the stream map, linker 208 may annotate each page with its ISA or provide a dynamically loadable page table with the ISA information as described earlier instead. Also, note that two homogeneous streams of two different ISA may have a caller/callee relationship. Similarly, two portions of a heterogeneous stream of two different ISA may also have a caller/callee relationship.

Thus, under the present invention, one or more collections of threads of POP implementing instructions of one or more ISA may be stored in ISA library 108. As a result, processor 100 may be initially deployed to effectuate execution of user instruction streams constituted with one ISA, and subsequently reconfigured to effectuate execution of user instruction streams constituted with another ISA. Alternatively, datapath 102 may be provided with multiple sets of resources, and by keeping track the ISA of corresponding user instruction streams 120, control logic 104 may control datapath 102 to effectuate execution of instructions of multiple ISA in parallel for multiple homogeneous user instruction streams, using the multiple sets of resources. Regardless of whether datapath 102 is provided with multiple sets of resources or not, within one set of resources of datapath 102, by tracking the ISA of different user instruction streams or different portions of an user instruction stream, control logic 104 may control datapath 102 to effectuate execution of instructions of multiple ISA serially or interleavingly, for multiple homogeneous user instruction streams or multiple homogeneous portions of an heterogeneous user instruction stream, using one set of resources of datapath 102.

Figure 5:
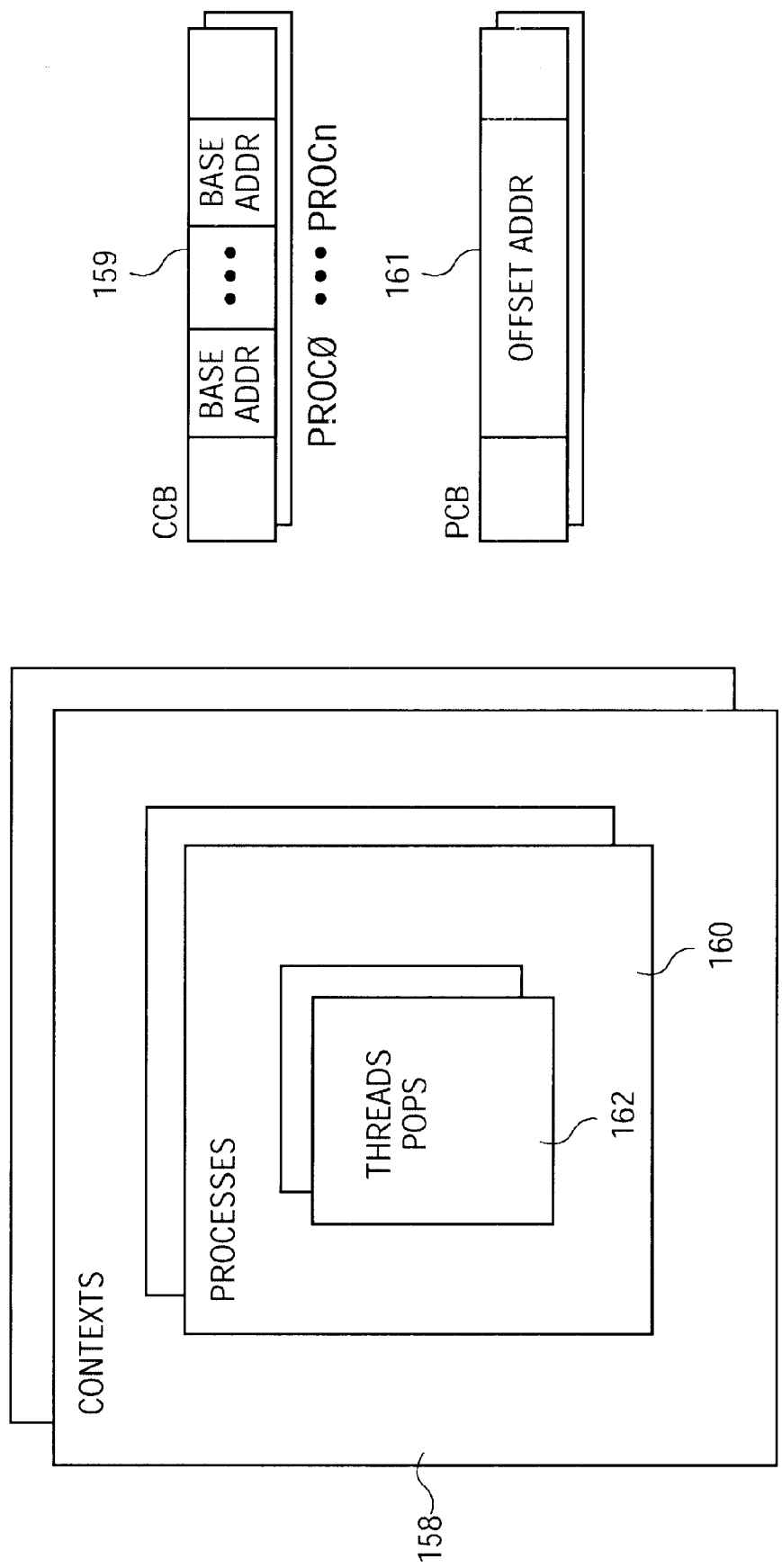
FIG. 5 illustrates the relationship between contexts, processes and threads.

FIG. 5 illustrates the relationship between contexts, processes, and threads as used herein. As shown, each context 158 includes one or more processes 160, and each process 160 in turn include one or more executing instances 162 of the earlier described threads 116, for effectuating execution of the instruction of the process 160, e.g. an user instruction stream. For the illustrated embodiment, associated with each context is a context control block (CCB) 159 storing control information about the context. These control information includes control variables known in the art. Additionally, in accordance with the present invention, the CCB includes in particular one or more ISA selectors 103, which for the illustrated embodiment, each ISA selector 103 is a base address control variable denoting the base address of a collection of implementing threads 116 of an ISA stored in ISA library 108 or a pre-stage storage structure of control logic 104, if the implementing threads are pre-staged in control logic 104. Similarly, associated with each process is a process control block (PCB) 161 storing control information about the process. The control information also includes various control variables known in the art. In addition, in accordance with the present invention, PCB includes in particular an offset address control variable denoting the MSB of the offset (from the above described base address for an ISA) to the start of the implementing thread of the current executing thread instance. The CCB and PCB 159 and 161 are created and maintained by control logic 104. In particular, the base addresses and offset addresses are dynamically modified by control logic 104 as it detects changes in ISA and successively schedules the snippets of the implementing threads. CCB 159 is created when a context is first created, whereas PCB 161 is created when a process is first spawned. The base address is initially set in accordance with the ISA of the starting process of a context, whereas the offset address is initially set to the beginning of the implementing thread of the first instruction. As alluded to earlier, the terms context and process are merely employed for "clarity" only, those skilled in the art will appreciate that in general, ISA base and offset addresses may be associated with any two hierarchical control levels.

Referring now back to FIG. 1, responsive to an instruction of a process, control logic 104 statically schedules a first snippet of an implementing thread for execution by datapath 102, updating the PCB as appropriate. As the POP of each atomic unit of a scheduled snippet are provided in order to datapath 102 for execution, control logic dynamically control execution of the issued POP in accordance with the specified execution condition, if any. In one embodiment, control logic 104 is equipped to process dynamic decision variables as well as determining the appropriate state transitions for a process/context. For the illustrated embodiment, the processing of dynamic decision variables as well as determining the appropriate state transitions for the processes and contexts are also accomplished using hierarchically organized POP. Furthermore, as described earlier, control logic 104 is also equipped to service various trap requests. In addition to the above described trap requests that are made upon completing execution of the snippets, to logically associate the snippets, trap requests are also made in response to values being written into certain special addressable storage locations. Typically, these are addressable storage locations employed to store various control variables. Servicing of trap requests is also accomplished using hierarchically organized POP.

An example of such addressable storage location is the location employed to function as an accumulator of the processor. A trap request is made to control logic 104 whenever a value is stored into the accumulator location, to allow a trap handler to update the state of the parity bit of the processor status word (PSW). Another example is the locations employed to store various power control bits. A trap request is made to control logic 104 whenever a value is stored into these power control bit locations, to allow a trap handler to examine whether execution is to be halted. A further example is the location employed to store a reset bit. A trap request is made to control logic 104 whenever a value is stored into the reset bit location, to allow a trap handler to determine whether to shut down all contexts.

Additionally, for the illustrated embodiment, control logic 104 is also equipped to effectuate data input/output via input/output (I/O) pins 106. However, based on the description to follow, those skilled in the art will appreciate that the present invention may be practiced without control logic 104 being responsible for effectuating data I/O via I/O pins 106. The term I/O pin as used herein is intended to include I/O pins in the conventional physical sense, as well as internal I/O "pins" in the figurative sense, employed to inter-couple internal blocks of a VLSI circuit. In other words, processor 100 is an embedded internal block of a larger VLSI circuit.

ISA library 108 may be implemented with any one of a number of non-volatile storage medium known in the art, including but not limited to EPROM, EEPROM, CMOS memory, Flash memory and so forth. Both datapath 102 and control logic 104, as well as their manner of cooperation will be further described below, after the descriptions of employing hierarchically organized POP to process dynamic decision variables, determine appropriate state transitions for processes and contexts, and service trap requests.

Figure 6:
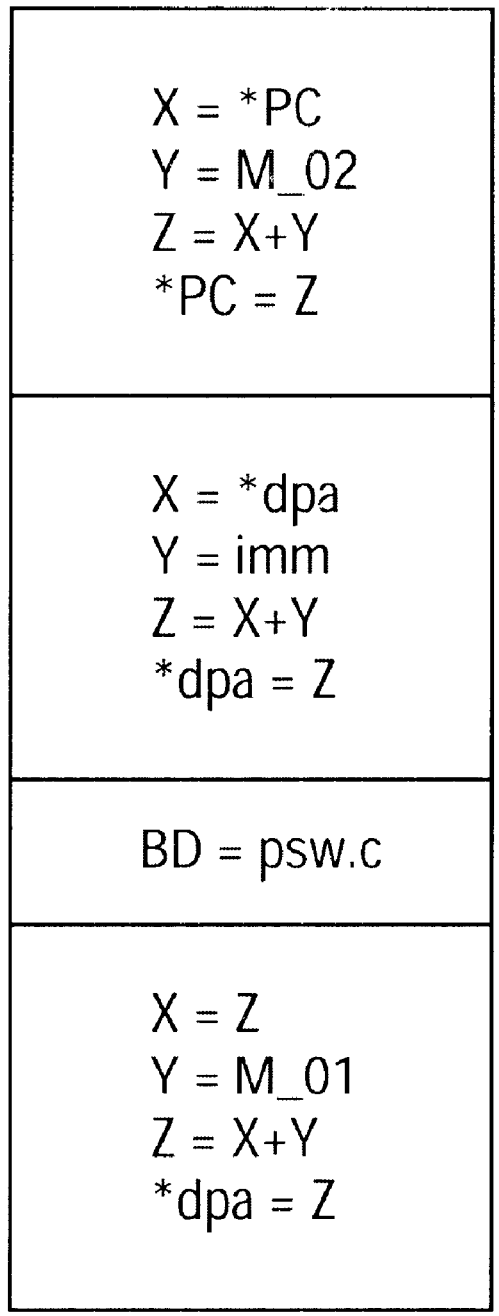
FIG. 6 illustrates various exemplary collections of POP for performing dynamic decision.

FIG. 6 illustrates three exemplary collections of POP employed to implement an add immediate with carry instruction (ADDC_I) instruction, including an exemplary collection of POP for processing a dynamic decision variable to facilitate control logic 104 in dynamically determining whether to further increment the result of the add instruction by one. The result is to be incremented if the carry flag is set. The first exemplary collection includes {x=*pc, y=m__02, z=x+y and *pc=z}, whereas the second exemplary collection includes {x=*dpa, y=imm, z=x+y, and *dpa=z}. The third exemplary collection includes {BD =psw.c}, whereas the fourth exemplary collection includes {x=z, y=m__01, z=x+y, and *dpa=z}.

Based on the earlier described collections, the meanings of the first, the second, and the fourth exemplary collections are readily apparent. For the third exemplary collection, POP "BD=psw.c" stands for copying the content of the carry bit of control variable processor status word (psw) into the addressable storage location for storing the branch decision variable BD.

In accordance with the present invention, the first two exemplary collections are organized into two atomic units, and then into a first snippet. Similarly, the third and the fourth exemplary collections are also organized into two atomic units, and then into a second snippet. An execution condition governing the conditional execution of the second atomic unit of the second snippet, i.e. only if BD equals 1, is specified for the second atomic unit. The second snippet is logically associated with the first snippet by specifying a trap request to control logic 104, and pre-defining the trap request to modify the thread offset address to access the second snippet.

Figure 7:
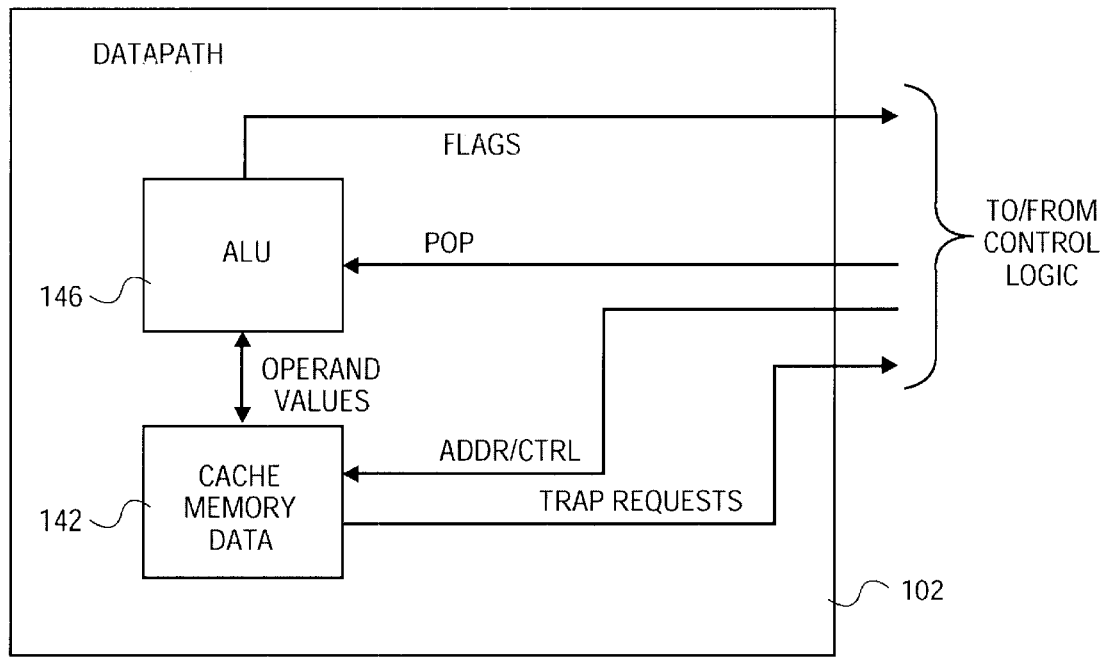
FIGS. 7–8 illustrate one embodiment each of the datapath and the control logic respectively.

FIG. 7 illustrates one embodiment of datapath 102 in more detail. For the illustrated embodiment, datapath 102 includes cache memory 142 and ALU 146, coupled to each other as shown. Cache memory 142 is employed by control logic 104 to directly supply and accept operand values to and from ALU 146. In other words, for the illustrated embodiment, unlike prior art datapaths, datapath 102 does not have physical accumulator or physical register file. ALU 146 is employed to execute hierarchically organized POP of the present invention, using operand values supplied by cache memory 142. ALU 146 may be implemented with any one of a number of circuitry known in the art. Cache memory 142 is described in the above identified incorporated by reference copending U.S. patent application Ser. No. 08/963,389, entitled "Cache Memory Based Instruction Execution", and incorporated by reference copending U.S. patent application Ser. No. 08/963,391, entitled "Virtual Register File" now U.S. Pat. No. 6,178,482.

During operation, control logic 104 selectively provides appropriate ones of the POP and location information of operand values to ALU 146 and cache memory 142 respectively. In response, cache memory 142 outputs the appropriate operand values for ALU 146, which in turn executes the provided POP, operating on the operand values output by cache memory 142. The resulting operand values are stored back into cache memory 142. Additionally, ALU 146 is designed to provide control logic 104 with various system flag values, such as the carry and zero flags described earlier, and cache memory 142 is designed to issue trap requests to control logic 104 as a result of data values being stored into certain pre-selected cache locations, such as the cache location that function as an accumulator, as described earlier. In one embodiment, the word lines of cache memory 142 are employed to issue the trap requests, by providing offsets into the above described trap vector table. The offsets are derived through word line mappings.

While datapath 102 is illustrated with only one ALU 146, those skilled in the art will appreciate that, the present invention may also be practiced with a datapath 102 that includes more ALU, e.g. one that allow the common PC update thread and/or implementing threads of different ISA to be executed in parallel.

Figure 8:
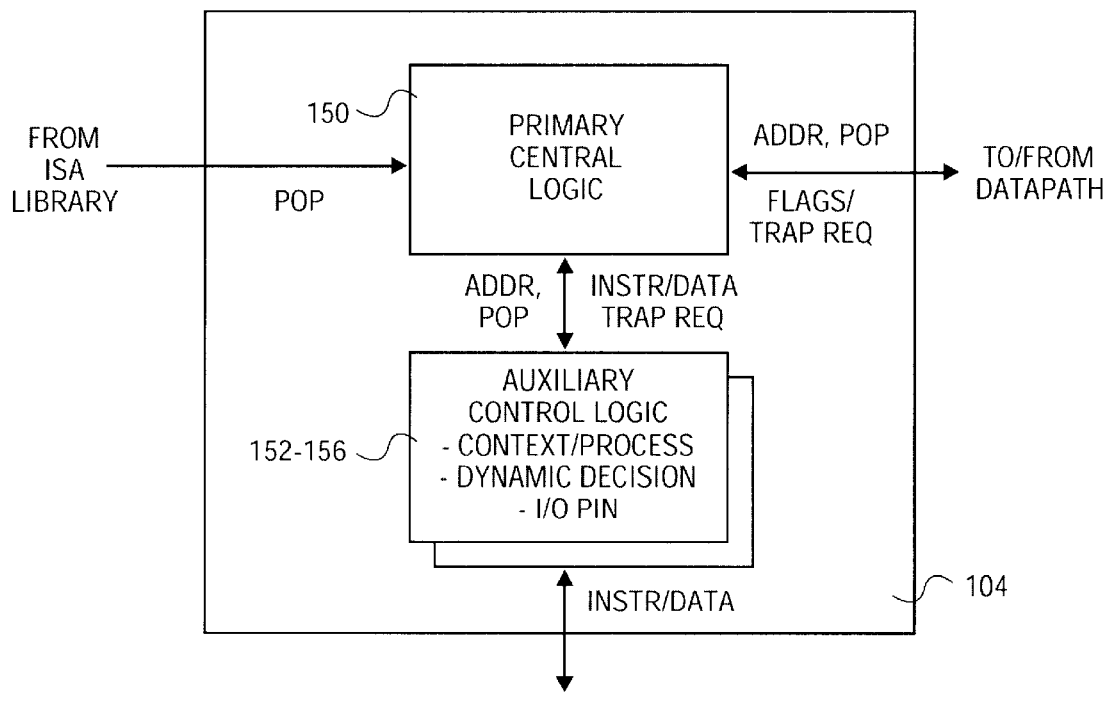

FIG. 8 illustrates one embodiment of control logic 104. For the illustrated embodiment, control logic 104 includes primary control unit (PCU) 150 and a number of auxiliary control units (ACU) 152–156. Specifically, for the illustrated embodiment, ACU 152–156 include a context/process ACU 152, a dynamic decision ACU 154, and an input/output (I/O) pin Acu 156. PCU 150 selectively controls datapath 102 to execute the hierarchically organized POP of the present invention with the assistance of ACU 152–156. Context/process ACU 152 is employed to assist PCU 150 in determining the appropriate state transitions for various contexts and processes. For the illustrated embodiment, the earlier described CCB and PCB for the various contexts and processes are maintained by context/process ACU 152. Dynamic decision ACU 154 is employed to assist PCU 150 in processing a number of dynamic decision variables, as described earlier. For the illustrated embodiment, the dynamic decision variables are maintained in the dynamic decision ACU 154. I/O pin ACU 156 is employed to assist PCU 150 in effectuating data input/output via the I/O pins 106 respectively. In alternate embodiments, more or less ACU may be employed.

Figure 9:
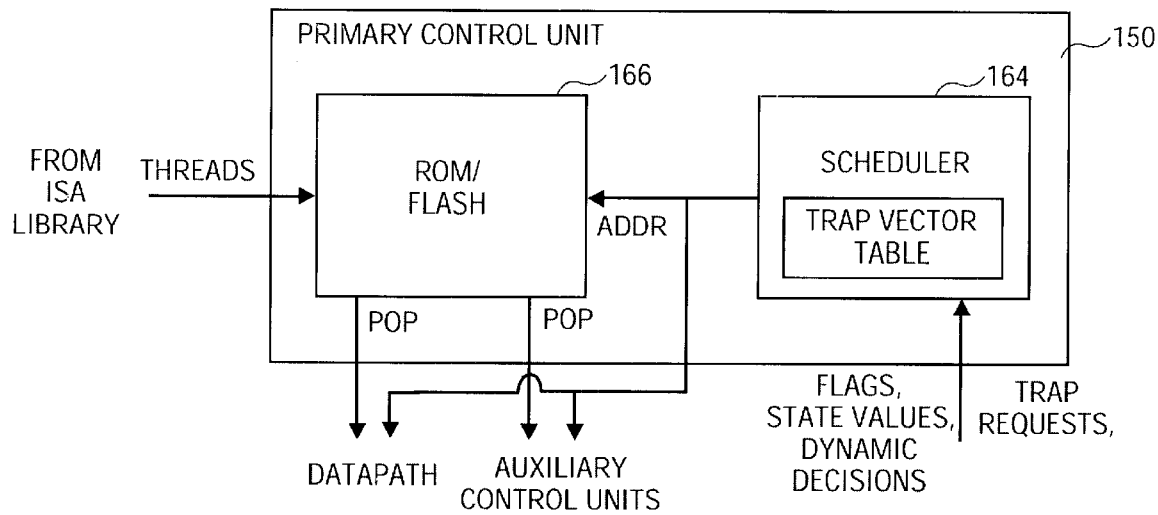
FIGS. 9–12 illustrate one embodiment each of a primary control unit, a context/process auxiliary control unit, a dynamic decision auxiliary control unit and an I/O pin auxiliary control unit respectively.

FIG. 9 illustrates one embodiment of PCU 150 in more detail. For the illustrated embodiment, PCU 150 includes scheduler 164 and memory 166 coupled to each other as shown. Scheduler 164 is employed to schedule selected ones of the snippets of the various threads of POP implementing instructions of an ISA. In addition to scheduling logic, which may be implemented employing any one of a number of approaches known in the art, scheduler 164 includes a trap vector table of trap handler addresses. Additionally, scheduler 164 is configured with the information identifying how many and which ISA are to be retrieved from ISA library 108. The configuration may be achieved in any one of a number of approaches known in the art. Memory 166 is used to pre-stage the implementing threads of an ISA. In one embodiment, memory 166 is partitioned into regions for storing the various implementing threads in accordance with their functions, i.e. implementing instructions, context/process management, dynamic decision making, trap handling, etc. Scheduler 164 and memory 166 may be implemented with any one of a number of circuitry known in the art.

During operation, responsive to instructions of the processes, e.g. user instruction streams, various snippets of the implementing threads are scheduled for execution. Responsive to addresses supplied by scheduler 164, memory 166 outputs the various hierarchically organized POP of the scheduled snippets to selected ones of datapath 102 and auxiliary control units 152–156. Scheduler 164 formulates the appropriate addresses to supply to memory 166 using the base and offset addresses maintained in the CCB and PCB of the various contexts and processes. As execution progresses, when necessary ACU 152–154 assist PCU 150 to examine execution conditions that govern the conditional execution of certain atomic units. Similarly, when necessary, scheduler 164 causes appropriate ones of various hierarchically organized POP to be output from memory 166 for context/process ACU 152 and dynamic decision ACU 154 to assist in determining appropriate state transitions and dynamic decisions respectively. Likewise, responsive to trap requests made to control logic 102, scheduler 164 using the trap handler address information maintained in trap vector table, causes appropriated ones of various hierarchically organized POP of the trap handlers to be output to selected ones of datapath 102 and ACU 152–154 for execution. In particular, selected ones of the trap handlers assist in maintaining the offset addresses in the PCB for successive scheduling of the snippets of the implementing threads. Additionally, as execution progresses, responsive to I/O trap requests, scheduler 164 causes appropriate ones of hierarchically organized POP to be output to I/O pin auxiliary ACU 156 to assist in effectuating data input/output via the I/O pins.

Figure 10:
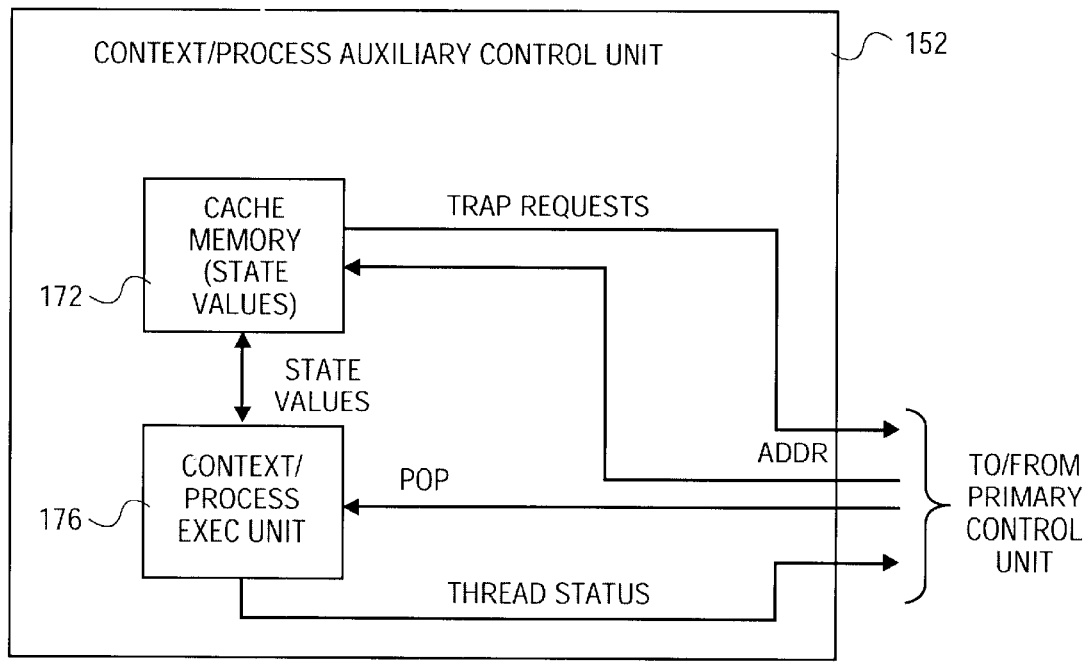

FIG. 10 illustrates one embodiment of context/process ACU 152 in more detail. For the illustrated embodiment, context/process ACU 152 includes cache memory 172 and execution unit 176, coupled to each other as shown. As described earlier, cache memory 172 is employed by control logic 104 to store CCB and PCB of various contexts and processes, and output the various control variables of CCB and PCB for processing by execution unit 176. Execution unit 176 is employed to execute the hierarchically organized POP output using operand values supplied by cache memory 172. Execution unit 176 may be implemented with any one of a number of circuitry known in the art. Cache memory 172 may be implemented in like manner as cache memory 142 of datapath 102. In one embodiment, the earlier described cache memory 142 of datapath 102 and cache memory 172 are implemented using the same physical structure.

During operation, control logic 104 selectively provides appropriate ones of the hierarchically organized POP and location information of control variable/state values to execution unit 176 and cache memory 142 respectively. In response, cache memory 172 outputs the appropriate control variable/state values for execution unit 176, which in turn executes the POP, and process the control variable/state values output by cache memory 172. The resulting control variable/state values are stored back into cache memory 172. Additionally, execution unit 176 is designed to provide control logic 104 with the states of the various executing thread instances, and cache memory 172 is designed to issue trap requests to control logic 104. The trap requests are issued as a result of state values being stored into certain locations of cache memory 172, such as the cache locations employed to store the reset bits, as described earlier. In one embodiment, the word lines of cache memory 172 are employed to issue the trap requests, by providing offsets into the above described trap vector table. The offsets are derived through word line mappings.

Figure 11:
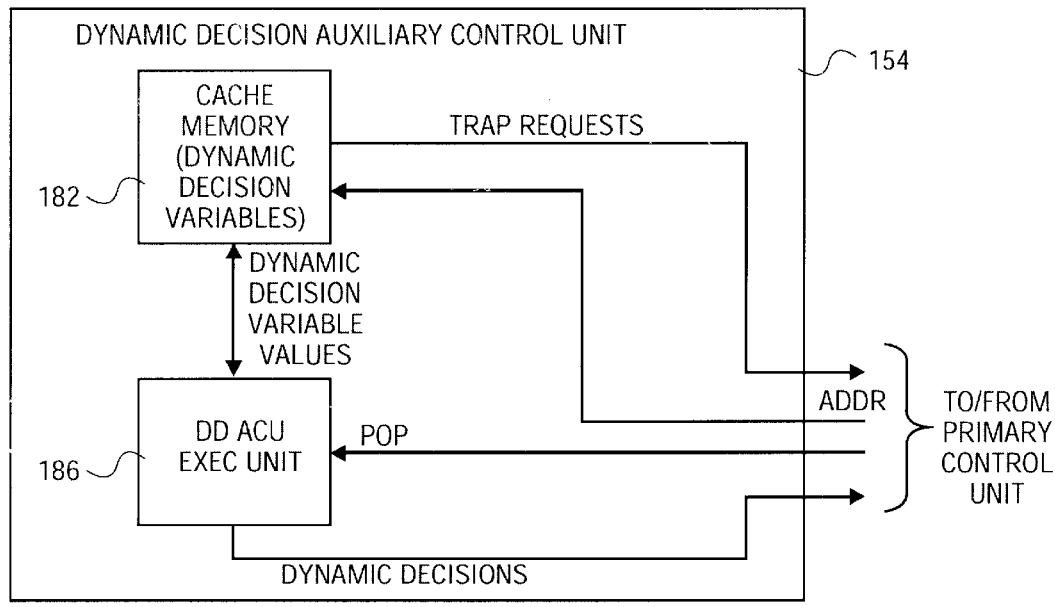

FIG. 11 illustrates one embodiment of dynamic decision ACU 154 in more detail. For the illustrated embodiment, dynamic decision ACU 154 includes cache memory 182 and execution unit 186, coupled to each other as shown. Cache memory 182 is employed by control logic 104 to store and output dynamic decision variable values for execution unit 186. Execution unit 186 is employed to execute hierarchically organized POP, using dynamic decision variable values supplied by cache memory 182. Execution unit 186 may be implemented with any one of a number of circuitry known in the art. Cache memory 182 may be implemented in like manner as cache memory 142 of datapath 102. In one embodiment, the earlier described cache memory 142 of datapath 102, cache memory 172 and cache memory 182 are implemented using the same physical structure.

During operation, control logic 104 selectively provides appropriate ones of the hierarchically organized and location information of dynamic decision variable values to execution unit 186 and cache memory 182 respectively. In response, cache memory 182 outputs the appropriate dynamic decision variable values for execution unit 186, which in turn executes the hierarchically organized POP, and process the dynamic decision variable values output by cache memory 182. The resulting dynamic decision variable values are stored back into cache memory 182. Additionally, execution unit 186 is designed to provide control logic 104 with the dynamic decisions determined, and cache memory 182 is designed to issue trap requests to control logic 104, such as the cache location employed to store the power control bits, as described earlier. The trap requests are issued as a result of dynamic decision variable values being stored into certain locations of cache memory 182. In one embodiment, the word lines of cache memory 182 are employed to issue the trap requests, by providing offsets into the above described trap vector table. The offsets are derived through word line mappings.

Figure 12:
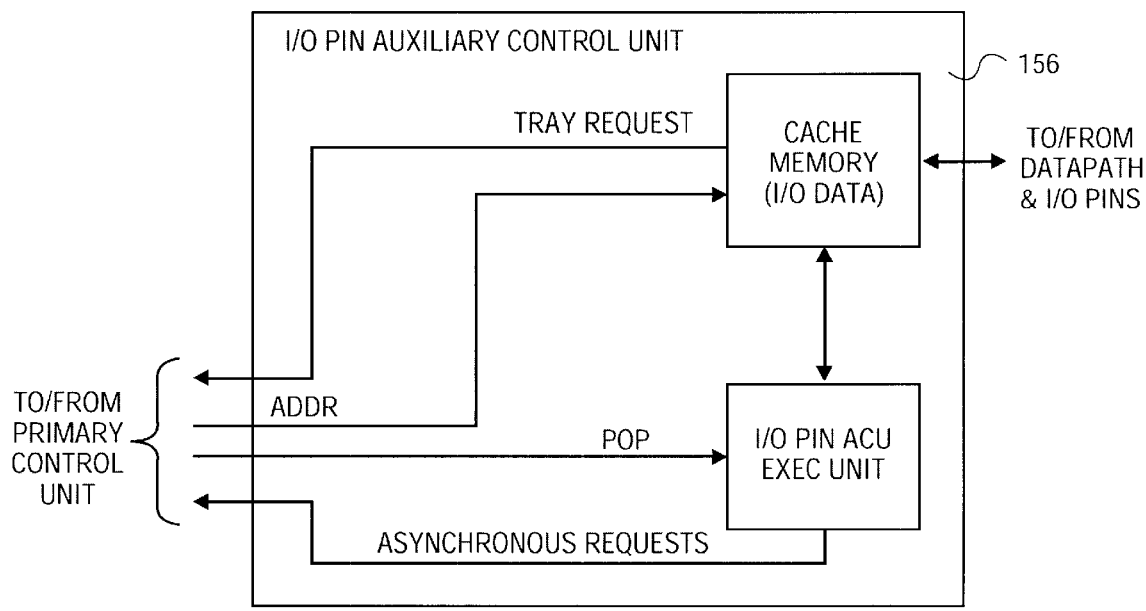

FIG. 12 illustrates one embodiment of I/O pin ACU 156 in more detail. For the illustrated embodiment, I/O ACU 154 is also similarly constituted as the other auxiliary ACU, including cache memory 192 and execution unit 196, coupled to each other as shown. Cache memory 192 is employed by control logic 104 to accept data input values from, and drive data output values to I/O pins 106. Execution unit 196 is employed to execute hierarchically organized POP, and cause cache memory 192 to accept or drive data input/output values. Execution unit 196 may be implemented with any one of a number of circuitry known in the art. Cache memory 192 may be implemented in like manner as cache memory 142 of datapath 102. In one embodiment, the earlier described cache memory 142 of datapath 102, cache memory 172, cache memory 182 and cache memory 192 are all implemented using the same physical structure.

During operation, control logic 104 selectively provides appropriate ones of the hierarchically organized POP and location information of data input/output values to execution unit 196 and cache memory 192 respectively. In response, execution unit 196 causes cache memory 192 to accept data input values from or drive data output values to I/O pins 106. Alternatively, execution unit 196 causes cache memory 192 to accept data output values from cache memory 142 or ALU 146 of datapath 102. Additionally, execution unit 196 is designed to provide control logic 104 with asynchronous requests, and cache memory 192 is designed to issue trap requests to control logic 104. The trap requests are issued as a result of data input/output values being stored into certain locations of cache memory 192. In one embodiment, the word lines of cache memory 192 are employed to issue the trap requests, by providing offsets into the above described trap vector table. The offsets are derived through word line mappings.

I/O pin control is the subject matter of copending U.S. patent application Ser. No. 08/963,346, entitled "Adaptable I/O Pin Control", filed Nov. 3, 1997, and having common assignee as well as inventorship with the present invention. This copending application is also hereby fully incorporated by reference.

The present invention has been described in terms of the above described embodiments for ease of understanding. Those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a more effective approach to supporting multiple ISA in a processor has been disclosed.

What is claimed is:

1. An apparatus comprising:
    a datapath for use to execute primitive operations;
    at least one control unit coupled to the datapath to control the datapath to selectively execute primitive operations of a first and a second collection of primitive operations, the collections of primitive operations hierarchically organized as atomic units and at least further organized into snippets of two or more atomic units each, to effectuate execution of instructions of a first and a second instruction set architecture (ISA), where instructions of the first and the second ISA are implemented by the primitive operations of the first and second collections of primitive operations respectively and the primitive operations of each atomic unit being issued to the datapath at the same time.

2. An apparatus comprising:
    a datapath to execute primitive operations;
    at least one control unit coupled to the datapath to control the datapath to selectively execute primitive operations of a first and a second collection of primitive operations, the collections of primitive operations hierarchically organized as atomic units and at least further organized into snippets of two or more atomic units each to effectuate execution of instructions of a first and a second instruction set architecture (ISA); and at least one ISA selector stored in a control block that is dynamically updateable, which ISA selector is accessible to the control logic to facilitate the control logic in controlling said datapath to selectively effectuate said execution of instructions of the first and the second ISA.

3. The apparatus as set forth in claim 2, wherein the at least one ISA selector facilitates the control logic in controlling said datapath to effectuate execution of instructions of the first and the second ISA for a first and a second deployment of the apparatus respectively.

4. The apparatus as set forth in claim 2, wherein the datapath includes a first and a second set of resources, and the at least one ISA selector facilitates the control logic in controlling said first and second sets of resources of the datapath to effectuate execution of instructions of the first and the second ISA respectively.

5. The apparatus as set forth in claim 2, wherein the datapath includes at least one set of resources, and the at least one ISA selector facilitates the control logic in controlling one of said at least one set of resources of said datapath to effectuate execution of instructions of a first and a second user instruction stream, where the instructions of the first and the second user instruction stream are instructions of said first and second ISA respectively.

6. The apparatus as set forth in claim 2, wherein the datapath includes at least one set of resources, and the at least one ISA selector facilitates the control logic in controlling one of said at least one set of resources of said datapath to effectuate execution of instructions of a first and a second portion of an user instruction stream, where the instructions of the first and the second portion are of said first and second ISA respectively.

7. The apparatus as set forth in claim 6, wherein the at least one ISA selector is configured in accordance with ISA control information identifying the ISA of the instructions of the first and the second portion of the user instruction stream.

8. The apparatus as set forth in claim 7, wherein the ISA control information is obtained from a selected one of an internal source of the user instruction stream and a source external to the user instruction stream.

9. The apparatus as set forth in claim 2, wherein the apparatus further comprises an ISA library coupled to the control logic to store first and second control information for the first and the second ISA respectively, and to selectively supply the stored first and second control information to the control logic.

10. The apparatus as set forth in claim 9, wherein the control information includes logical to physical mappings of the first and the second ISA.

11. A method of executing instructions comprising:
a) executing first primitive operations of a first collection of primitive operations to effectuate execution of a first instruction of a first instruction set architecture (ISA),
b) executing second primitive operations of a second collection of primitive operations to effectuate of a second instruction of a second instruction set architecture (ISA),
wherein the first collections of primitive operations and second collection of primitive operations are hierarchically organized as atomic units and at least further organized into snippets of two or more atomic units each.

12. The method of claim 11, wherein (a) includes receiving the first instruction, which is part of a first instruction stream, and (b) includes receiving the second instruction, which is part of a second instruction stream.

13. The method of claim 11, wherein (a) includes receiving the first instruction, which is part of a first portion of an instruction stream, and (b) includes receiving the second instruction, which is part of a second portion of the same instruction stream.

14. The method of claim 11, wherein (a) includes receiving the first instruction, which is part of a caller routine, and (b) includes receiving the second instruction, which is part of a callee routine.

15. The method of claim 11, wherein (a) includes selecting a first set of resources of a datapath, and (b) includes selecting a second set of resources of the same datapath.

16. The method of claim 11, wherein the method further includes (c) selecting a set of resources of a datapath to perform (a) and (b).

17. The method of claim 11, wherein the method further includes (c) receiving ISA control information for performing (a) and (b).

18. The method of claim 17, wherein (c) receiving the ISA control information from a selected one of an internal source of a multi-portion instruction stream and a source external to the multi-portion instruction stream.

19. An apparatus comprising:
a datapath to execute primitive operations;
at least one control unit coupled to the datapath to control the execution of instructions of a first and a second instruction set architecture (ISA), wherein the instructions are implemented by a first and a second collection of primitive operations respectively; and
an ISA library coupled with the data path and with the at least one control unit, the ISA library including the first and the second collection of primitive operations, the first and the second collection of primitive operations hierarchically organized into atomic units and further organized into snippets of two or more atomic units each, wherein the hierarchically organized primitives of the first and the second collection of primitive operations implement the instructions of the first and the second ISA responsive to the control of the control unit.

20. The apparatus as set forth in claim 19, wherein the snippets are further organized into execution threads.

21. The apparatus as set forth in claim 19, wherein the apparatus further includes at least one ISA selector accessible to the control logic to facilitate the control logic in said selective control of said datapath.

22. The apparatus as set forth in claim 21, wherein the at least one ISA selector facilitates the control logic in said selective control of said datapath for a first and a second deployment of the apparatus.

23. The apparatus as set forth in claim 21, wherein the datapath includes a first and a second set of resources, and the at least one ISA selector facilitates the control logic in said selective control of said datapath for said first and second sets of resources.

24. The apparatus as set forth in claim 21, wherein the datapath includes at least one set of resources, and the at least one ISA selector facilitates the control logic in selective control of one of said at least one set of resources of said datapath for a first and a second user instruction stream comprising of instructions of said first and second ISA respectively.

25. The apparatus as set forth in claim 21, wherein the datapath includes at least one set of resources, and the at least one ISA selector facilitates the control logic in selective control of one of said at least one set of resources of said datapath for a first and a second portion of an user instruction stream comprising of instructions of said first and second ISA repectively.

26. The apparatus as set forth in claim 25, wherein the at least one ISA selector is configured in accordance with ISA control information identifying the ISA of the instructions of the first and the second portion of the user instruction stream.

27. The apparatus as set forth in claim 26, wherein the ISA control information is obtained from the selected one of an internal source of the user instruction stream and a source external to the user instruction stream.

28. The apparatus as set forth in claim 21, wherein the ISA selector is a base address facilitating the control logic in locating either the first or the second collection of primitive operations.

29. The apparatus as set forth in claim 19 , wherein the ISA library further stores first and second control information for the first and the second ISA, and selectively supplies the stored first and second control information to the control logic.

30. The apparatus as set forth in claim 29, wherein the control information includes logical to physical mappings of the first and the second ISA.

31. An apparatus comprising:
- a datapath means to execute primitive operations;
- at least one control unit means coupled to the datapath to control the execution of instructions of a first and a second ISA, the instructions of the first and the second ISA implemented by primitive operations of a first and a second collection of primitive operations respectively;
- an ISA library means coupled with the datapath and with the at least one control unit to provide the first and the second collection of primitive operations, the first and the second collection of primitive operations hierarchically organized into atomic units and further organized into snippets of two or more atomic units each; and
- an ISA selector means to dynamically select among the first and the second collection of primitive operations respectively to execute the instructions of the first and second ISA.

* * * * *